United States Patent
Takahashi et al.

(10) Patent No.: US 11,831,018 B2
(45) Date of Patent: Nov. 28, 2023

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Naoki Takahashi, Tokyo (JP); Norikazu Yamamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 136 days.

(21) Appl. No.: 16/308,818

(22) PCT Filed: Jun. 23, 2017

(86) PCT No.: PCT/JP2017/023256
§ 371 (c)(1),
(2) Date: Dec. 11, 2018

(87) PCT Pub. No.: WO2018/003707
PCT Pub. Date: Jan. 4, 2018

(65) Prior Publication Data
US 2019/0148732 A1    May 16, 2019

(30) Foreign Application Priority Data

Jun. 29, 2016   (JP) ................. 2016-129100

(51) Int. Cl.
| | |
|---|---|
| *H01M 4/62* | (2006.01) |
| *H01M 4/02* | (2006.01) |
| *H01M 4/04* | (2006.01) |
| *H01M 10/0566* | (2010.01) |
| *C08L 47/00* | (2006.01) |
| *C08L 9/00* | (2006.01) |
| *H01M 10/052* | (2010.01) |

(52) U.S. Cl.
CPC ............... *H01M 4/622* (2013.01); *C08L 9/00* (2013.01); *C08L 47/00* (2013.01); *H01M 4/62* (2013.01); *H01M 10/0566* (2013.01); *C08L 2203/20* (2013.01); *C08L 2205/025* (2013.01); *H01M 10/052* (2013.01); *H01M 2004/027* (2013.01); *H01M 2004/028* (2013.01)

(58) Field of Classification Search
CPC .... H01M 4/622; H01M 10/0566; H01M 4/62; H01M 4/0404; H01M 4/1391; H01M 10/0525; H01M 10/058; H01M 2300/0017; H01M 4/13; H01M 10/052; H01M 2004/027; H01M 2004/028; C08L 9/00; C08L 47/00; C08L 2203/20; C08L 2205/025; Y02E 60/10

USPC .......................................................... 427/217
See application file for complete search history.

(56) References Cited

U.S. PATENT DOCUMENTS

| | | | |
|---|---|---|---|
| 2013/0330622 A1* | 12/2013 | Sasaki ................. | H01M 4/1395 252/182.1 |
| 2014/0065336 A1 | 3/2014 | Nakashima et al. | |
| 2014/0154569 A1* | 6/2014 | Maeda .................. | H01G 11/66 429/211 |
| 2015/0125746 A1 | 5/2015 | Sonobe et al. | |
| 2015/0125755 A1 | 5/2015 | Ishii | |
| 2015/0132643 A1* | 5/2015 | Sasaki .................. | H01M 4/134 429/217 |
| 2016/0036055 A1* | 2/2016 | Yamamoto .......... | H01M 4/1395 429/217 |
| 2016/0260973 A1 | 9/2016 | Sonobe et al. | |
| 2017/0279152 A1* | 9/2017 | Toyoda ................ | H01M 2/166 |
| 2018/0375099 A1* | 12/2018 | Akiike ................ | H01M 50/449 |

FOREIGN PATENT DOCUMENTS

| | | | |
|---|---|---|---|
| CN | 103718355 A | | 4/2014 |
| CN | 104247109 A | | 12/2014 |
| CN | 104396060 B | * | 3/2015 |
| CN | 105637683 A | | 6/2016 |
| JP | H08250123 A | | 9/1996 |
| JP | 2012204303 A | | 10/2012 |
| JP | WO2014051067 | * | 2/2013 |
| JP | 5861698 B2 | | 2/2016 |
| KR | 1020140051893 A | | 5/2014 |
| KR | 1020150132156 A | | 11/2015 |
| WO | 2012115096 A1 | | 8/2012 |
| WO | 2013180166 A1 | | 12/2013 |
| WO | 2014148064 A1 | | 9/2014 |
| WO | 2016051713 A1 | | 4/2016 |

OTHER PUBLICATIONS

Aug. 1, 2017, International Search Report issued in the International Patent Application No. PCT/JP2017/023256.
Jan. 8, 2020, the Extended European Search Report issued by the European Patent Office in the corresponding European Patent Application No. 17820064.8.
Jan. 1, 2019, International Preliminary Report on Patentability issued in the International Patent Application No. PCT/JP2017/023256.

* cited by examiner

*Primary Examiner* — Christian Roldan
(74) *Attorney, Agent, or Firm* — KENJA IP LAW PC

(57) ABSTRACT

Provided is a binder composition for a non-aqueous secondary battery electrode that can form an electrode that has excellent peel strength and for which metal deposition at the surface thereof after charging and discharging is inhibited. The binder composition contains a polymer A and a polymer B. The polymer A has a THF-insoluble content of 60 mass % or less and the polymer B has a THF-insoluble content of 80 mass % or more.

4 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. Consequently, in recent years, studies have been made to improve battery members such as electrodes for the purpose of achieving even higher non-aqueous secondary battery performance.

An electrode for a secondary battery, such as a lithium ion secondary battery, generally includes a current collector and an electrode mixed material layer formed on the current collector. The electrode mixed material layer is formed, for example, by applying, onto the current collector, a slurry composition in which an electrode active material, a binder-containing binder composition, and so forth are dispersed in a dispersion medium, and drying the applied slurry composition.

In recent years, there have been attempts to improve binder compositions used in the formation of electrode mixed material layers in order to further improve secondary battery performance. In one specific example, PTL 1 proposes an aqueous binder for battery electrode formation having, as a main component, a styrene-butadiene copolymer latex that has a butadiene bond content of 40 mass % to 98 mass % and a gel content of 20 weight % to 74 weight % as measured using toluene. According to PTL 1, this aqueous binder for battery electrode formation has excellent binding capacity and can suitably be used to obtain a secondary battery that has a long cycle life and is resistant to long-term use and storage.

CITATION LIST

Patent Literature

PTL 1: JP H8-250123 A

SUMMARY

Technical Problem

However, an electrode in which the conventional binder composition described above is used suffers from a problem that a large amount of metal, such as lithium, deposits at the surface of the electrode after charging and discharging of a secondary battery. There is also room for improvement of the conventional binder composition described above in terms of sufficiently increasing close adhesion strength between an electrode mixed material layer and a current collector (i.e., peel strength of an electrode).

Accordingly, one objective of the present disclosure is to provide a binder composition for a non-aqueous secondary battery electrode and a slurry composition for a non-aqueous secondary battery electrode that can form an electrode that has excellent peel strength and for which metal deposition at the surface thereof after charging and discharging is inhibited.

Another objective of the present disclosure is to provide an electrode for a non-aqueous secondary battery that has excellent peel strength and for which metal deposition at the surface thereof after charging and discharging is inhibited, and a non-aqueous secondary battery including this electrode for a non-aqueous secondary battery.

Solution to Problem

The inventors conducted diligent investigation with the aim of solving the problems set forth above. Through this investigation, the inventors discovered that when a polymer in which insoluble content with respect to THF (tetrahydrofuran) is a specific value or less and another type of polymer in which such insoluble content is a specific value or more are used in combination as a binder, a binder composition for a non-aqueous secondary battery electrode can be obtained that can provide an electrode with excellent peel strength and can inhibit metal deposition at the surface of the electrode after charging and discharging. In this manner, the inventors completed the present disclosure.

Specifically, the present disclosure aims to advantageously solve the problems set forth above by disclosing a binder composition for a non-aqueous secondary battery electrode comprising a polymer A and a polymer B, wherein the polymer A has a THF-insoluble content of 60 mass % or less and the polymer B has a THF-insoluble content of 80 mass % or more. Through use of a binder composition that contains a polymer A having a THF-insoluble content of 60 mass % or less and a polymer B having a THF-insoluble content of 80 mass % or more in this manner, it is possible to obtain an electrode that has excellent peel strength and for which metal deposition at the surface thereof after charging and discharging is inhibited.

The "THF-insoluble content" of a polymer referred to in the present disclosure can be measured by a method described in the EXAMPLES section of the present specification.

In the presently disclosed binder composition for a non-aqueous secondary battery electrode, the polymer A preferably includes an aliphatic conjugated diene monomer unit in a proportion of at least 60 mass % and not more than 98 mass %. When the polymer A includes an aliphatic conjugated diene monomer unit in the aforementioned proportion, electrode bending resistance can be increased, and when, for example, an electrolyte solution is injected into a case having battery members such as an electrode enclosed therein during secondary battery production, the electrolyte solution can favorably penetrate into the electrode (i.e., good electrolyte solution injectability can be ensured).

The phrase "includes a monomer unit" as used in the present disclosure means that "a polymer obtained with that monomer includes a repeating unit derived from the monomer".

In the presently disclosed binder composition for a non-aqueous secondary battery electrode, the polymer B preferably includes an aliphatic conjugated diene monomer unit in a proportion of at least 20 mass % and not more than 70 mass %. When the polymer B includes an aliphatic conjugated diene monomer unit in the aforementioned proportion, electrode bending resistance can be increased, and good electrolyte solution injectability in secondary battery production can be ensured.

In the presently disclosed binder composition for a non-aqueous secondary battery electrode, the polymer B preferably has a volume-average particle diameter of at least 0.01 μm and not more than 0.5 μm. When the volume-average particle diameter of the polymer B is within the range set forth above, electrode peel strength can be further increased while further inhibiting metal deposition at the electrode surface after charging and discharging.

The term "volume-average particle diameter" as used in the present disclosure refers to a particle diameter (D50) at which, in a particle diameter distribution (volume basis) measured by laser diffraction, cumulative volume calculated from a small diameter end of the distribution reaches 50%.

In the presently disclosed binder composition for a non-aqueous secondary battery electrode, content of the polymer B is preferably at least 20 mass % and not more than 80 mass % of total content of the polymer A and the polymer B. When the proportion constituted by the polymer B among the total of the polymer A and the polymer B is within the range set forth above, electrode bending resistance can be improved. In addition, electrode peel strength can be further increased while further inhibiting metal deposition at the electrode surface after charging and discharging.

Moreover, the present disclosure aims to advantageously solve the problems set forth above by disclosing a slurry composition for a non-aqueous secondary battery electrode comprising: an electrode active material; and any one of the binder compositions for a non-aqueous secondary battery electrode set forth above. Through use of a slurry composition containing an electrode active material and any one of the binder compositions set forth above in this manner, an electrode that has excellent peel strength and for which metal deposition at the surface thereof after charging and discharging is inhibited can be produced.

Furthermore, the present disclosure aims to advantageously solve the problems set forth above by disclosing an electrode for a non-aqueous secondary battery comprising an electrode mixed material layer formed using the slurry composition for a non-aqueous secondary battery electrode set forth above. When an electrode mixed material layer is formed using the slurry composition for a non-aqueous secondary battery electrode set forth above in this manner, an electrode for a non-aqueous secondary battery that has excellent peel strength and for which metal deposition at the surface thereof after charging and discharging is inhibited can be obtained.

Also, a presently disclosed non-aqueous secondary battery comprises a positive electrode, a negative electrode, an electrolyte solution, and a separator, wherein at least one of the positive electrode and the negative electrode is the electrode for a non-aqueous secondary battery set forth above. Through use of the electrode for a non-aqueous secondary battery set forth above in this manner, a non-aqueous secondary battery having excellent battery characteristics can be obtained.

Advantageous Effect

According to the present disclosure, it is possible to provide a binder composition for a non-aqueous secondary battery electrode and a slurry composition for a non-aqueous secondary battery electrode that can form an electrode that has excellent peel strength and for which metal deposition at the surface thereof after charging and discharging is inhibited.

Moreover, according to the present disclosure, it is possible to provide an electrode for a non-aqueous secondary battery that has excellent peel strength and for which metal deposition at the surface thereof after charging and discharging is inhibited, and a non-aqueous secondary battery including this electrode for a non-aqueous secondary battery.

DETAILED DESCRIPTION

The following provides a detailed description of embodiments of the present disclosure.

A presently disclosed binder composition for a non-aqueous secondary battery electrode can be used in the production of a slurry composition for a non-aqueous secondary battery electrode. The slurry composition for a non-aqueous secondary battery electrode produced using the presently disclosed binder composition for a non-aqueous secondary battery electrode can be used in the formation of an electrode of a non-aqueous secondary battery such as a lithium ion secondary battery. A presently disclosed non-aqueous secondary battery uses the electrode for a non-aqueous secondary battery formed using the presently disclosed slurry composition for a non-aqueous secondary battery electrode.

Note that the presently disclosed binder composition for a non-aqueous secondary battery electrode and slurry composition for a non-aqueous secondary battery electrode are particularly suitable for use in formation of a negative electrode of a non-aqueous secondary battery.

(Binder Composition for Non-Aqueous Secondary Battery Electrode)

The presently disclosed binder composition for a non-aqueous secondary battery electrode contains a polymer A and a polymer B, and may optionally further contain other components that can be contained in secondary battery electrodes. Moreover, the presently disclosed binder composition for a non-aqueous secondary battery electrode normally further contains a dispersion medium such as water. In the presently disclosed binder composition for a non-aqueous secondary battery electrode, the polymer A has a THF-insoluble content of 60 mass % or less and the polymer B has a THF-insoluble content of 80 mass % or more.

When the presently disclosed binder composition for a non-aqueous secondary battery electrode is used in formation of an electrode mixed material layer of an electrode (i.e., when used as a binder composition for an electrode mixed material layer), the electrode can be provided with excellent peel strength and deposition of metal, such as lithium, at the surface of the electrode in charging and discharging of a secondary battery can be inhibited as a result of the presently disclosed binder composition for a non-aqueous secondary battery electrode containing the polymer A having a comparatively low THF-insoluble content and the polymer B having a comparatively high THF-insoluble content as described above. The reason that peel strength of an electrode can be increased while inhibiting metal deposition at the surface of the electrode by using the two above-described polymers having different THF-insoluble contents as a binder is presumed to be as follows. Firstly, the polymer A has a THF-insoluble content of 60 mass % or less. The polymer A having a comparatively low THF-insoluble content as described above tends to retain electrolyte solution in a secondary battery as a result of having a small number of crosslinking sites. Consequently, through use of the polymer A, a homogeneous porous structure of an electrode mixed material layer can be preserved even upon repeated charging and discharging, and the formation of recesses into which metal ions such as lithium ions can enter after charging and discharging can be inhibited. Moreover, uneven distribution of metal ions can be prevented, and deposition of metal at an electrode surface can be inhibited. On the other hand, the polymer B has a THF-insoluble content of 80 mass % or more. The polymer B having a comparatively high THF-insoluble content as described above has excellent binding capacity as a result of having high tensile fracture strength. The combined use of these polymers A and B is thought to increase the peel strength of an electrode and inhibit metal deposition of lithium or the like at the surface of the electrode.

<Polymer A>

In an electrode produced by forming an electrode mixed material layer on a current collector using a slurry composition for a non-aqueous secondary battery electrode produced using the binder composition, the polymer A holds components contained in the electrode mixed material layer to prevent these components detaching from the electrode mixed material layer (i.e., the polymer A functions as a binder).

«THF-Insoluble Content»

The THF-insoluble content of the polymer A is required to be 60 mass % or less, and is more preferably 50 mass % or less, even more preferably 48 mass % or less, particularly preferably 45 mass % or less, and most preferably 30 mass % or less. Deposition of metal, such as lithium, at the surface of an electrode after charging and discharging of a secondary battery cannot be sufficiently inhibited if the THF-insoluble content of the polymer A is more than 60 mass %. Note that no specific limitations are placed on the lower limit for the THF-insoluble content of the polymer A, and the THF-insoluble content may be 0 mass % or more.

The THF-insoluble content of the polymer A can be adjusted by altering the proportion constituted by an aliphatic conjugated diene monomer among monomers in a monomer composition for production of the polymer A and polymerization conditions such as the amount of molecular weight modifier that is used, the reaction temperature, and the reaction time.

«Volume-Average Particle Diameter»

The polymer A preferably exhibits a particulate form in at least the presently disclosed binder composition. In other words, the polymer A is preferably a particulate polymer. The volume-average particle diameter of the polymer A is preferably 0.01 μm or more, more preferably 0.02 μm or more, and even more preferably 0.05 μm or more, and is preferably 0.20 μm or less, more preferably 0.15 μm or less, and even more preferably 0.13 μm or less. When the volume-average particle diameter of the polymer A is 0.01 μm or more, a homogeneous porous structure of an electrode mixed material layer can be maintained and uneven distribution of metal ions can be inhibited, which can further inhibit deposition of metal, such as lithium, at the surface of an electrode after charging and discharging of a secondary battery. On the other hand, when the volume-average particle diameter of the polymer A is 0.20 μm or less, specific surface area of the polymer A can be ensured, and electrode peel strength can be further increased.

The volume-average particle diameter of the polymer A can be adjusted by altering polymerization conditions such as the amount of emulsifier that is used.

«Chemical Composition of Polymer A»

No specific limitations are placed on the chemical composition of the polymer A so long as the THF-insoluble content of the polymer A does not exceed the prescribed value. For example, the polymer A preferably includes an aliphatic conjugated diene monomer unit as a repeating unit and may include monomer units other than the aliphatic conjugated diene monomer unit (hereinafter, referred to as "other monomer units").

[Aliphatic Conjugated Diene Monomer Unit]

Examples of aliphatic conjugated diene monomers that may be used to form the aliphatic conjugated diene monomer unit include, but are not specifically limited to, 1,3-butadiene, 2-methyl-1,3-butadiene (isoprene), and 2,3-dimethyl-1,3-butadiene. Of these aliphatic conjugated diene monomers, 1,3-butadiene and isoprene are preferable. One aliphatic conjugated diene monomer may be used individually, or two or more aliphatic conjugated diene monomers may be used in combination in a freely selected ratio.

The proportion constituted by the aliphatic conjugated diene monomer unit in the polymer A when the amount of all repeating units in the polymer A is taken to be 100 mass % is preferably 60 mass % or more, more preferably 63 mass % or more, and even more preferably 65 mass % or more, and is preferably 98 mass % or less, more preferably 95 mass % or less, and even more preferably 93 mass % or less. Electrode bending resistance is improved when the percentage content of the aliphatic conjugated diene monomer unit is 60 mass % or more, whereas affinity of the polymer A with electrolyte solution can be ensured, and electrolyte solution injectability in secondary battery production can be improved when the percentage content of the aliphatic conjugated diene monomer unit is 98 mass % or less.

[Other Monomer Units]

Examples of monomer units other than the above-described aliphatic conjugated diene monomer unit that may be included in the polymer A include, but are not specifically limited to, repeating units derived from known monomers that are copolymerizable with aliphatic conjugated diene monomers such as described above. Specific examples of other monomer units include, but are not specifically limited to, a nitrile group-containing monomer unit, an aromatic vinyl monomer unit, a (meth)acrylic acid ester monomer unit, and a hydrophilic group-containing monomer unit.

One of such monomers may be used individually, or two or more of such monomers may be used in combination. In the present disclosure, "(meth)acryl" is used to indicate "acryl" and/or "methacryl".

From a viewpoint of further increasing electrode peel strength while favorably controlling THF-insoluble content to an appropriate value, the polymer A preferably includes a nitrile group-containing monomer unit, and more preferably includes both a nitrile group-containing monomer unit and an aromatic vinyl monomer unit as other monomer units.

Examples of nitrile group-containing monomers that may be used to form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these nitrile group-containing monomers, acrylonitrile and methacrylonitrile are preferable.

Examples of aromatic vinyl monomers that may be used to form the aromatic vinyl monomer unit include styrene, styrenesulfonic acid and salts thereof, α-methylstyrene, butoxystyrene, and vinylnaphthalene.

Examples of (meth)acrylic acid ester monomers that may be used to form the (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

Examples of hydrophilic group-containing monomers that may be used to form the hydrophilic group-containing monomer unit include polymerizable monomers having a hydrophilic group. Specific examples of hydrophilic group-containing monomers include carboxy group-containing monomers, sulfo group-containing monomers, phosphate group-containing monomers, and hydroxy group-containing monomers.

Examples of carboxy group-containing monomers include monocarboxylic acids, derivatives of monocarboxylic acids, dicarboxylic acids, acid anhydrides of dicarboxylic acids, and derivatives of these dicarboxylic acids and acid anhydrides.

Examples of monocarboxylic acids include acrylic acid, methacrylic acid, and crotonic acid.

Examples of monocarboxylic acid derivatives include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of dicarboxylic acid derivatives include methylmaleic acid, dimethylmaleic acid, phenylmaleic acid, chloromaleic acid, dichloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a carboxy group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1-COO-(C_qH_{2q}O)_p-H$ (where p represents an integer of 2 to 9, q represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

The percentage content of other monomer units in the polymer A is preferably 0 mass % to 40 mass %, more preferably 37 mass % or less, and even more preferably 35 mass % or less.

«Production of polymer A»

The polymer A can be produced as a random copolymer, for example, through polymerization, in an aqueous solvent, of a monomer composition that contains the monomers set forth above, but is not specifically limited to being produced in this manner. The percentage content of each monomer in the monomer composition is normally the same as the percentage content of the corresponding monomer unit in the target polymer.

The aqueous solvent is not specifically limited so long as the polymer A can be dispersed therein, and may be water used individually or a mixed solvent of water and another solvent.

The mode of polymerization is not specifically limited and may, for example, be any of solution polymerization, suspension polymerization, bulk polymerization, and emulsion polymerization. The method of polymerization may, for example, be any of ionic polymerization, radical polymerization, and living radical polymerization.

Moreover, no specific limitations are placed on molecular weight modifiers, emulsifiers, polymerization initiators, and the like that may be used in polymerization and any of those described in JP 5861698 B may be used, for example.

In particular, t-dodecyl mercaptan and a-methylstyrene dimer are preferable, and t-dodecyl mercaptan is more preferable as a molecular weight modifier used in production of the polymer A. The amount of molecular weight modifier that is used when all monomers in the monomer composition used in production of the polymer A are taken to be 100 parts by mass is preferably 0.01 parts by mass or more, more preferably 0.02 parts by mass or more, and even more preferably 0.05 parts by mass or more, and is preferably 1.2 parts by mass or less, more preferably 1.0 parts by mass or less, and even more preferably 0.8 parts by mass or less. In other words, the polymer A is preferably a polymer obtained through polymerization of a monomer composition containing one or more monomers and a molecular weight modifier, and the amount of the molecular weight modifier contained in the monomer composition per 100 parts by mass of all monomers is preferably 0.01 parts by mass or more, more preferably 0.02 parts by mass or more, and even more preferably 0.05 parts by mass or more, and is preferably 1.2 parts by mass or less, more preferably 1.0 parts by mass or less, and even more preferably 0.8 parts by mass or less. In a case in which the polymer A is produced using an aliphatic conjugated diene monomer, for example, a crosslinked structure readily forms in polymerization reaction due to the presence of the aliphatic conjugated diene monomer, and the molecular weight of the polymer readily increases to a high level, which tends to increase the THF-insoluble content described above. However, the use of a molecular weight modifier within any of the ranges set forth above can inhibit molecular weight of the polymer A increasing to a high level and a high level of crosslinking occurring due to the aliphatic conjugated diene monomer unit, and can, therefore, prevent an excessive increase in the THF-insoluble content of the polymer A.

Although no specific limitations are placed on the production conditions of the polymer A, it is preferable that a polymerization reaction is carried out over a long period at a comparatively low temperature.

Specifically, the reaction temperature is preferably 0° C. or higher, and more preferably 5° C. or higher, and is preferably 30° C. or lower, more preferably 20° C. or lower, and even more preferably 15° C. or lower. The reaction time is preferably 8 hours or more, and more preferably 12 hours or more, and is preferably 30 hours or less, and more preferably 28 hours or less. By adopting a reaction temperature and a reaction time such as set forth above, reaction efficiency can be ensured while also inhibiting molecular weight of the polymer A increasing to a high level and a high level of crosslinking occurring due to the aliphatic conjugated diene monomer unit, and thereby preventing an excessive increase in the THF-insoluble content of the polymer A.

<Polymer B>

In an electrode produced by forming an electrode mixed material layer on a current collector using a slurry composition for a non-aqueous secondary battery electrode produced using the binder composition, the polymer B holds components contained in the electrode mixed material layer to prevent these components detaching from the electrode mixed material layer (i.e., the polymer B functions as a binder in conjunction with the polymer A set forth above).

«THF-Insoluble Content»

The THF-insoluble content of the polymer B is required to be 80 mass % or more, is preferably 82 mass % or more, and more preferably 85 mass % or more, and is preferably 98 mass % or less, and more preferably 97 mass % or less. If the THF-insoluble content of the polymer B is less than 80 mass %, tensile fracture strength of the polymer B is lost, and electrode peel strength decreases. On the other hand, electrolyte solution injectability in secondary battery production can be improved when the THF-insoluble content of the polymer B is 98 mass % or less.

The THF-insoluble content of the polymer B can be adjusted by altering the proportion constituted by an aliphatic conjugated diene monomer among monomers in a monomer composition for production of the polymer B and polymerization conditions such as the amount of molecular weight modifier that is used, the reaction temperature, and the reaction time.

«Volume-Average Particle Diameter»

The polymer B preferably exhibits a particulate form in at least the presently disclosed binder composition. In other words, the polymer B is preferably a particulate polymer. The volume-average particle diameter of the polymer B is preferably 0.01 µm or more, more preferably 0.02 µm or more, and even more preferably 0.1 µm or more, and is preferably 0.5 µm or less, more preferably 0.3 µm or less, and even more preferably 0.2 µm or less. When the volume-average particle diameter of the polymer B is 0.01 µm or more, a homogeneous porous structure of an electrode mixed material layer can be maintained and the occurrence of overvoltage at the surface of an electrode can be inhibited, which can inhibit deposition of metal, such as lithium, at the electrode surface after charging and discharging of a secondary battery. On the other hand, when the volume-average particle diameter of the polymer B is 0.5 µm or less, specific surface area of the polymer B can be ensured, and electrode peel strength can be increased.

The volume-average particle diameter of the polymer B can be adjusted by altering polymerization conditions such as the amount of emulsifier that is used.

«Chemical Composition of Polymer B»

No specific limitations are placed on the chemical composition of the polymer B so long as the THF-insoluble content of the polymer B does not fall below the prescribed value. For example, the polymer B preferably includes an aliphatic conjugated diene monomer unit as a repeating unit and may include monomer units other than the aliphatic conjugated diene monomer unit (hereinafter, referred to as "other monomer units").

[Aliphatic Conjugated Diene Monomer Unit]

Examples of aliphatic conjugated diene monomers that may be used to form the aliphatic conjugated diene monomer unit of the polymer B include the same aliphatic conjugated diene monomers as may be used to form the aliphatic conjugated diene monomer unit of the polymer A set forth above. Of these aliphatic conjugated diene monomers, 1,3-butadiene and isoprene are preferable as aliphatic conjugated diene monomers for forming the aliphatic conjugated diene monomer unit of the polymer B. One aliphatic conjugated diene monomer may be used individually, or two or more aliphatic conjugated diene monomers may be used in combination in a freely selected ratio.

The proportion constituted by the aliphatic conjugated diene monomer unit in the polymer B when the amount of all repeating units in the polymer B is taken to be 100 mass % is preferably 20 mass % or more, more preferably 25 mass % or more, and even more preferably 30 mass % or more, and is preferably 70 mass % or less, more preferably 60 mass % or less, and even more preferably 50 mass % or less. Electrode bending resistance can be increased when the percentage content of the aliphatic conjugated diene monomer unit is 20 mass % or more because flexibility of the polymer B is ensured, whereas affinity of the polymer B with electrolyte solution can be ensured, and electrolyte solution injectability in secondary battery production can be improved when the percentage content of the aliphatic conjugated diene monomer unit is 70 mass % or less.

[Other Monomer Units]

Examples of monomer units other than the above-described aliphatic conjugated diene monomer unit that may be included in the polymer B include, but are not specifically limited to, repeating units derived from known monomers that are copolymerizable with aliphatic conjugated diene monomers such as described above. Specific examples of other monomer units include, but are not specifically limited to, an aromatic vinyl monomer unit, a (meth)acrylic acid ester monomer unit, and a hydrophilic group-containing monomer unit.

One of such monomers may be used individually, or two or more of such monomers may be used in combination.

From a viewpoint of further increasing electrode peel strength, the polymer B preferably includes an aromatic vinyl monomer unit as another monomer unit.

Examples of aromatic vinyl monomers that may be used to form the aromatic vinyl monomer unit of the polymer B include the same aromatic vinyl monomers as may be used to form other monomer units of the polymer A set forth above. Of these aromatic vinyl monomers, styrene is preferable as an aromatic vinyl monomer for forming the aromatic vinyl monomer unit of the polymer B.

Examples of (meth)acrylic acid ester monomers and hydrophilic group-containing monomers that may be used to form the (meth)acrylic acid ester monomer unit and the hydrophilic group-containing monomer unit of the polymer B include the same (meth)acrylic acid ester monomers and hydrophilic group-containing monomers as may be used to form other monomer units of the polymer A. Of these monomers, methyl methacrylate and 2-ethylhexyl acrylate are preferable as (meth)acrylic acid ester monomers that may be used to form the (meth)acrylic acid ester monomer unit of the polymer B. Moreover, carboxy group-containing monomers and hydroxy group-containing monomers are preferable, and itaconic acid and 2-hydroxyethyl acrylate are more preferable as hydrophilic group-containing monomers for forming the hydrophilic group-containing monomer unit.

The percentage content of other monomer units in the polymer B is preferably 0 mass % to 80 mass %, more preferably 75 mass % or less, and even more preferably 70 mass % or less.

The polymer B can be produced through polymerization of a monomer composition containing the above-described monomers but is not specifically limited to being produced in this manner. The percentage content of each monomer in the monomer composition is normally the same as the percentage content of the corresponding monomer unit in the target polymer. No specific limitations are placed on the mode of polymerization of the polymer B. For example, any of solution polymerization, suspension polymerization, bulk polymerization, and emulsion polymerization may be used. Moreover, the polymerization reaction may be addition polymerization such as ionic polymerization, radical polymerization, or living radical polymerization. A molecular weight modifier, emulsifier, polymerization initiator, or the like used in polymerization may be the same as typically used and the amount thereof may also be the same as typically used.

<Mixing Ratio of Polymer A and Polymer B>

The content of the polymer B in the presently disclosed binder composition as a proportion of the total content of the polymer A and the polymer B is preferably 20 mass % or more, more preferably 25 mass % or more, even more preferably 30 mass % or more, and particularly preferably 40 mass % or more, and is preferably 80 mass % or less, more preferably 70 mass % or less, and even more preferably 60 mass % or less. When the content of the polymer B as a proportion relative to the total content of the polymer A and the polymer B is 20 mass % or more, electrode bending resistance can be increased and electrode peel strength can be further improved. On the other hand, when the content of the polymer B as a proportion relative to the total content of the polymer A and the polymer B is 80 mass % or less, deposition of metal, such as lithium, at the surface of an electrode after charging and discharging of a secondary battery can be further inhibited while ensuring bending resistance of the electrode.

It should be noted that the presently disclosed binder composition may also contain optional polymers other than the polymer A and the polymer B described above as a binder.

<Dispersion Medium>

The dispersion medium contained in the presently disclosed binder composition may be water, for example, but is not specifically limited thereto. The dispersion medium may alternatively be an aqueous solution of any compound or a mixed solution of water and a small amount of an organic solvent.

<Other Components>

The presently disclosed binder composition may contain components other than those described above such as reinforcing materials, leveling agents, viscosity modifiers, and additives for electrolyte solution. These other components are not specifically limited so long as they do not affect the battery reactions and may be selected from commonly known components such as those described in WO 2012/115096 A1. One of these components may be used individually, or two or more of these components may be used in combination in a freely selected ratio.

<Production Method of Binder Composition>

The presently disclosed binder composition may be produced, for example, by mixing a dispersion liquid containing the polymer A, a dispersion liquid containing the polymer B, and other optional components, but is not specifically limited to being produced in this manner. Note that in a situation in which a dispersion liquid containing a polymer is used in production of the binder composition, liquid content of this dispersion liquid may be used as the dispersion medium of the binder composition.

(Slurry Composition for Non-Aqueous Secondary Battery Electrode)

The presently disclosed slurry composition for a non-aqueous secondary battery electrode contains an electrode active material and the binder composition set forth above, and may optionally further contain other components. In other words, the presently disclosed slurry composition for a non-aqueous secondary battery electrode normally contains an electrode active material, the above-described polymers A and B, and a dispersion medium, and may optionally further contain other components. As a result of containing the binder composition set forth above, the presently disclosed slurry composition can provide an electrode with excellent peel strength when used in formation of an electrode mixed material layer of the electrode, and can also inhibit deposition of metal, such as lithium, at the surface of the electrode after charging and discharging of a secondary battery. Moreover, a non-aqueous secondary battery can be caused to display excellent battery characteristics by using an electrode that is formed using the binder composition containing the polymer A.

Although the following describes, as one example, a case in which the slurry composition for a non-aqueous secondary battery electrode is a slurry composition for a lithium ion secondary battery negative electrode, the presently disclosed slurry composition for a non-aqueous secondary battery electrode is not limited to the following example.

<Electrode Active Material>

The electrode active material is a material that accepts and donates electrons in an electrode of a secondary battery. The negative electrode active material of a lithium ion secondary battery is normally a material that can occlude and release lithium.

Specific examples of negative electrode active materials for lithium ion secondary batteries include carbon-based negative electrode active materials, metal-based negative electrode active materials, and negative electrode active materials formed by combining these materials.

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

Examples of carbonaceous materials include graphitizing carbon and non-graphitizing carbon, typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of graphitic materials include natural graphite and artificial graphite.

Examples of the artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

The metal-based negative electrode active material is an active material that contains metal, the structure of which usually contains an element that allows insertion of lithium, and that exhibits a theoretical electric capacity per unit mass of 500 mAh/g or more when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

<Binder Composition>

The presently disclosed binder composition for a non-aqueous secondary battery electrode containing the polymer A and the polymer B can be used as a binder composition.

The content of the polymer A originating from the binder composition in the slurry composition in terms of solid content per 100 parts by mass of the electrode active material is preferably 0.1 parts by mass or more, and more preferably 0.2 parts by mass or more, and is preferably 5 parts by mass or less, and more preferably 3 parts by mass or less. The content of the polymer B originating from the binder composition in the slurry composition in terms of solid content per 100 parts by mass of the electrode active material is preferably 0.1 parts by mass or more, and more preferably 0.2 parts by mass or more, and is preferably 5 parts by mass or less, and more preferably 3 parts by mass or less.

<Other Components>

Examples of other components that may be contained in the slurry composition include, but are not specifically limited to, the same other components as may be contained in the presently disclosed binder composition. The slurry composition may further contain a conductive material such as carbon black. One of such other components may be used individually, or two or more of such other components may be used in combination in a freely selected ratio.

<Production of Slurry Composition>

The slurry composition set forth above may be produced by dispersing or dissolving the above-described components in a dispersion medium such as water. Specifically, the slurry composition may be produced by mixing the components and the dispersion medium using a mixer such as a ball mill, a sand mill, a bead mill, a pigment disperser, a grinding machine, an ultrasonic disperser, a homogenizer, a planetary mixer, or a FILMIX. Mixing of the above-mentioned components and the dispersion medium may normally be performed for 10 minutes to several hours in a temperature range of room temperature to 80° C. The dispersion medium that is used in production of the slurry composition may be the same type of dispersion medium as in the binder composition. Moreover, the dispersion medium used in production of the slurry composition may include the dispersion medium that was contained in the binder composition.

(Electrode for Non-Aqueous Secondary Battery)

The presently disclosed electrode for a non-aqueous secondary battery includes an electrode mixed material layer formed using the slurry composition for a non-aqueous secondary battery electrode set forth above, and normally includes a current collector having the electrode mixed material layer formed thereon. The electrode mixed material layer contains at least an electrode active material, polymer originating from the polymer A, and polymer originating from the polymer B, and may optionally further contain other components. It should be noted that components contained in the electrode mixed material layer are components that were contained in the slurry composition for a non-aqueous secondary battery electrode. Furthermore, the preferred ratio of these components in the electrode mixed material layer is the same as the preferred ratio of these components in the slurry composition. In a case in which the polymer A and the polymer B were in a particulate form in the slurry composition, the polymer A and the polymer B may also be in a particulate form, or in any other form, in the electrode mixed material layer formed using the slurry composition.

The presently disclosed electrode for a non-aqueous secondary battery has excellent peel strength as a result of a slurry composition that contains the presently disclosed binder composition being used. Moreover, metal, such as lithium, does not excessively deposit at the surface of the presently disclosed electrode for a non-aqueous secondary battery after a secondary battery including the electrode is repeatedly charged and discharged. Consequently, a secondary battery having excellent battery characteristics is obtained through use of this electrode.

<Production Method of Electrode>

The presently disclosed electrode for a non-aqueous secondary battery can be produced, for example, through a step of applying the above-described slurry composition onto the current collector (application step) and a step of drying the slurry composition that has been applied onto the current collector to form an electrode mixed material layer on the current collector (drying step).

[Application Step]

The slurry composition can be applied onto the current collector by a commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability.

Specifically, the current collector may be made of, for example, iron, copper, aluminum, nickel, stainless steel, titanium, tantalum, gold, or platinum. One of these materials may be used individually, or two or more of these materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. Drying of the slurry composition on the current collector in this manner forms an electrode mixed material layer on the current collector and thereby provides an electrode for a secondary battery that includes the current collector and the electrode mixed material layer.

After the drying step, the electrode mixed material layer may be further subjected to pressing treatment, such as mold pressing or roll pressing. This pressing treatment can further improve peel strength of the electrode. Furthermore, in a case in which the electrode mixed material layer contains a curable polymer, the polymer is preferably cured after the electrode mixed material layer has been formed.

(Non-Aqueous Secondary Battery)

The presently disclosed non-aqueous secondary battery includes a positive electrode, a negative electrode, an electrolyte solution, and a separator, wherein the presently disclosed electrode for a non-aqueous secondary battery is used as at least one of the positive electrode and the negative electrode. The presently disclosed non-aqueous secondary battery has excellent battery characteristics as a result of including the presently disclosed electrode for a non-aqueous secondary battery.

The presently disclosed secondary battery is preferably a secondary battery in which the presently disclosed electrode for a secondary battery is used as the negative electrode. Although the following describes, as one example, a case in which the secondary battery is a lithium ion secondary battery, the presently disclosed secondary battery is not limited to the following example.

<Electrodes>

As explained above, the presently disclosed electrode for a non-aqueous secondary battery is used as at least one of the positive electrode and the negative electrode. In other words, the positive electrode of the lithium ion secondary battery may be the presently disclosed electrode and the negative electrode of the lithium ion secondary battery may be a known negative electrode other than the presently disclosed electrode. Alternatively, the negative electrode of the lithium ion secondary battery may be the presently disclosed electrode and the positive electrode of the lithium ion secondary battery may be a known positive electrode other than the presently disclosed electrode. Further alternatively, the positive electrode and the negative electrode of the lithium ion secondary battery may both be the presently disclosed electrode.

Note that when a known electrode other than the presently disclosed electrode for a non-aqueous secondary battery is used, this electrode may be an electrode that is obtained by forming an electrode mixed material layer on a current collector by a known production method.

<Electrolyte Solution>

The electrolyte solution is normally an organic electrolyte solution obtained by dissolving a supporting electrolyte in an organic solvent. The supporting electrolyte of a lithium ion secondary battery may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein.

Suitable examples of organic solvents that may be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region.

The concentration of the electrolyte in the electrolyte solution can be adjusted as appropriate and is, for example, preferably 0.5 mass % to 15 mass %, more preferably 2 mass % to 13 mass %, and even more preferably 5 mass % to 10 mass %. Known additives such as vinylene carbonate, fluoroethylene carbonate, and ethyl methyl sulfone may be added to the electrolyte solution.

<Separator>

The separator may be a separator such as described in JP 2012-204303 A, for example, but is not specifically limited thereto. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

<Production Method of Secondary Battery>

The presently disclosed secondary battery may be produced, for example, by stacking the positive electrode and the negative electrode with the separator in-between, performing rolling, folding, or the like of the resultant laminate in accordance with the battery shape as necessary to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to measure and evaluate the THF-insoluble content and volume-average particle diameter of a polymer, the electrolyte solution injectability in secondary battery production, the bending resistance and peel strength of a negative electrode, and the amount of lithium deposition on a negative electrode.

<THF-Insoluble Content>

An obtained water dispersion of a polymer was dried in an environment having a humidity of 50% and a temperature of 23° C. to 25° C. to produce a film of 3±0.3 mm in thickness. The produced film was cut into 5 mm squares to prepare film pieces. Approximately 1 g of these film pieces were precisely weighed out. The weight of the precisely weighed films pieces was taken to be W0. Next, the precisely weighed film pieces were immersed in 100 g of tetrahydrofuran (THF) for 24 hours at 25° C. The film pieces were subsequently pulled out of the THF and were vacuum dried for 3 hours at 105° C. The weight W1 of the dried film pieces (weight of insoluble content) was measured. The THF-insoluble content (%) was calculated by the following formula.

THF-insoluble content (%)=W1/W0×100

<Volume-Average Particle Diameter>

The solid content concentration of an obtained water dispersion of a polymer was adjusted to 0.1 mass %. A particle diameter distribution (volume basis) was then measured with respect to the water dispersion of the polymer that had undergone solid content concentration adjustment using a laser diffraction particle diameter distribution analyzer (produced by Beckman Coulter, Inc.; product name: LS-230). In the obtained particle diameter distribution, the particle diameter at which cumulative volume calculated from the small diameter end of the distribution reached 50% was determined as the volume-average particle diameter (D50) of the polymer (particulate polymer).

<Electrolyte Solution Injectability>

An electrolyte solution (solvent: propylene carbonate; electrolyte: $LiPF_6$ of 1 M in concentration) was dripped onto the surface at the negative electrode mixed material layer-side of a produced negative electrode (post-pressing) in an amount of 1 μL. The time from this dripping until the electrolyte solution penetrated into the negative electrode mixed material layer and disappeared from the surface (penetration time) was measured, and was evaluated by the following standard. A shorter penetration time indicates better electrolyte solution injectability in production of a secondary battery using the negative electrode.

A: Penetration time of less than 300 s
B: Penetration time of at least 300 s and less than 350 s
C: Penetration time of at least 350 s and less than 400 s
D: Penetration time of 400 s or more <Bending Resistance>

A produced negative electrode (post-pressing) was wound around a cylinder made of stainless steel that had a diameter of 3 mm, and the occurrence of cracking in the surface of the negative electrode mixed material layer during this winding was visually inspected. In a case in which cracking was not observed, the same operation was performed using stainless steel cylinders having smaller diameters of 2 mm and 1 mm in this order. The cylinder diameter at which cracking was first observed in the negative electrode mixed material layer surface of the negative electrode (cylinder diameter at which cracking occurs) was recorded, and was evaluated by the following standard. A smaller value for the cylinder diameter at which cracking occurs indicates better negative electrode bending resistance. Moreover, when cracking does not occur even using a cylinder of 1 mm in diameter, this indicates that negative electrode bending resistance is especially good.

A: Cracking not observed even at cylinder diameter of 1 mm
B: Cracking occurs at cylinder diameter of 1 mm
C: Cracking occurs at cylinder diameter of 2 mm
D: Cracking occurs at cylinder diameter of 3 mm <Peel Strength>

A produced negative electrode (post-pressing) was cut out as a rectangle of 100 mm in length by 10 mm in width to obtain a specimen. The specimen was placed with the surface of the negative electrode mixed material layer underneath, and cellophane tape was affixed to the surface of the negative electrode mixed material layer. Tape prescribed by JIS Z1522 was used as the cellophane tape. Moreover, the cellophane tape was fixed to a test stage. Thereafter, one end of the current collector was pulled vertically upward at a pulling speed of 50 mm/min to peel off the current collector, and the stress during this peeling was measured. This measurement was made three times and an average value of the stress was determined. The average value was taken to be the peel strength. A larger peel strength indicates better close adhesion strength between the negative electrode mixed material layer and the current collector.

A: Peel strength of 24 N/m or more
B: Peel strength of at least 19 N/m and less than 24 N/m
C: Peel strength of less than 19 N/m <Amount of Lithium Deposition>

A produced lithium ion secondary battery was left at rest for 5 hours in a 25° C. environment after electrolyte solution injection. The lithium ion secondary battery was subsequently charged to a cell voltage of 3.65 V by a 0.2 C constant-current method in a 25° C. environment and was then subjected to 12 hours of aging in a 60° C. environment. Next, the lithium ion secondary battery was discharged to a cell voltage of 3.00 V by a 0.2 C constant-current method in a 25° C. environment. The lithium ion secondary battery was further subjected to CC-CV charging with a 0.2 C constant current (upper limit cell voltage 4.30 V) and CC discharging with a 0.2 C constant current (lower limit voltage 3.00 V).

Thereafter, the lithium ion secondary battery was subjected to 10 cycles of 0.5 C constant-current charging and discharging between 4.30 V and 3.00 V in a 25° C. environment. In addition, the lithium ion secondary battery was subjected to CC-CV charging with a 0.5 C constant current (upper limit cell voltage 4.30 V) in a 25° C. environment. The lithium ion secondary battery was then disassembled in an inert atmosphere to remove the negative electrode. The removed negative electrode was washed with diethyl carbonate, and then the area over which lithium was deposited was measured as percentage area (%) relative to negative electrode area (mixed material layer surface), and was evaluated by the following standard.

A: Percentage area of 0% (no lithium deposition)
B: Percentage area of more than 0% and less than 50%
C: Percentage area of at least 50% and not more than 100%

Example 1

<Production of Polymer A>

A reactor was charged with 180 parts of deionized water, 25 parts of sodium dodecylbenzenesulfonate aqueous solution (concentration 10%) as an emulsifier, 5 parts of acrylonitrile as a nitrile group-containing monomer, 19 parts of styrene as an aromatic vinyl monomer, 4 parts of methacrylic acid as a carboxy group-containing monomer, and 0.25 parts of t-dodecyl mercaptan as a molecular weight modifier in this order. Next, gas inside the reactor was purged with nitrogen three times, and then 72 parts of 1,3-butadiene was added as an aliphatic conjugated diene monomer. With the reactor maintained at 10° C., 0.1 parts of cumene hydroperoxide was added as a polymerization initiator to initiate a polymerization reaction and the polymerization reaction was continued for 16 hours under stirring. Next, 0.1 parts of hydroquinone aqueous solution (concentration 10%) was added as a polymerization inhibitor to terminate the polymerization reaction and then residual monomer was removed using a rotary evaporator with a water temperature of 60° C. to yield a water dispersion of a polymer A (particulate polymer). The THF-insoluble content and volume-average particle diameter of this polymer A were measured. The results are shown in Table 1.

<Production of Polymer B>

A reactor was charged with 150 parts of deionized water, 25 parts of sodium dodecylbenzenesulfonate aqueous solution (concentration 10%) as an emulsifier, 63 parts of styrene as an aromatic vinyl monomer, 3.5 parts of itaconic acid as a carboxy group-containing monomer, 1 part of 2-hydroxyethyl acrylate as a hydroxy group-containing monomer, and 0.5 parts of t-dodecyl mercaptan as a molecular weight modifier in this order. Next, gas inside the reactor was purged with nitrogen three times, and then 32.5 parts of 1,3-butadiene was added as an aliphatic conjugated diene monomer. With the reactor maintained at 60° C., 0.5 parts of potassium persulfate was added as a polymerization initiator to initiate a polymerization reaction and the polymerization reaction was continued under stirring. At the point at which the polymerization conversion rate reached 96%, cooling was performed and 0.1 parts of hydroquinone aqueous solution (concentration 10%) was added as a polymerization inhibitor to terminate the polymerization reaction. Thereafter, residual monomer was removed using a rotary evaporator with a water temperature of 60° C. to yield a water dispersion of a polymer B (particulate polymer). The THF-insoluble content and volume-average particle diameter of this polymer B were measured. The results are shown in Table 1.

<Production of Binder Composition>

The water dispersion of the polymer A and the water dispersion of the polymer B were added into a vessel such that the polymer A and the polymer B had a solid content ratio of polymer A:polymer B=50:50. These materials were stirred for 1 hour using a Three-One Motor to obtain a binder composition.

<Production of Slurry Composition>

A planetary mixer equipped with a disper blade was charged with 70 parts of artificial graphite (produced by Hitachi Chemical Co., Ltd.; product name: MAG-E) and 30 parts of natural graphite (produced by Nippon Carbon Co., Ltd.; product name: 604A) as negative electrode active materials, 1 part of carbon black (produced by Timcal Ltd.; product name: Super C65) as a conductive material, and 1 part in terms of solid content of a 1% aqueous solution of carboxymethyl cellulose (produced by Nippon Paper Industries Co., Ltd.; product name: MAC-350HC) as a viscosity modifier to obtain a mixture. The obtained mixture was adjusted to a solid content concentration of 58% with deionized water and was subsequently mixed for 60 minutes at 25° C. Next, the mixture was adjusted to a solid content concentration of 52% with deionized water and was then further mixed for 15 minutes at 25° C. to yield a liquid mixture. Deionized water and 2 parts in terms of solid content of the binder composition for a non-aqueous secondary battery electrode were added to the resultant mixture, and the final solid content concentration was adjusted to 48%. Further mixing was performed for 10 minutes and then a defoaming process was carried out under reduced pressure to yield a slurry composition for a non-aqueous secondary battery negative electrode having good fluidity.

<Production of Negative Electrode>

The obtained slurry composition for a non-aqueous secondary battery negative electrode was applied onto copper foil (current collector) of 20 μm in thickness using a comma coater such that a negative electrode mixed material layer obtained after drying had a weight per unit area of 11 mg/cm$^2$ and a density of 1.05 g/cm$^3$. The applied slurry composition was dried by conveying the copper foil inside a 60° C. oven for 2 minutes at a speed of 0.5 m/min. Thereafter, heat treatment was performed for 2 minutes at 120° C. to obtain a pre-pressing negative electrode web. The pre-pressing negative electrode web was rolled by roll pressing to obtain a post-pressing negative electrode including a negative electrode mixed material layer of 1.65 g/cm$^3$ in density.

The electrolyte solution injectability in secondary battery production, and the bending resistance and peel strength of the negative electrode were evaluated. The results are shown in Table 1.

<Production of Positive Electrode>

A mixture of 100 parts of $LiCoO_2$ having a volume-average particle diameter of 12 µm as a positive electrode active material, 2 parts of acetylene black (produced by Denki Kagaku Kogyo Kabushiki Kaisha; product name: HS-100) as a conductive material, 2 parts in terms of solid content of polyvinylidene fluoride (produced by Kureha Corporation; product name: #7208) as a binder, and N-methylpyrrolidone as a solvent was prepared with a total solid content concentration of 70%. These materials were mixed using a planetary mixer to obtain a slurry composition for a non-aqueous secondary battery positive electrode.

The obtained slurry composition for a non-aqueous secondary battery positive electrode was applied onto aluminum foil (current collector) of 20 µm in thickness using a comma coater such as to have a thickness of approximately 150 µm after drying. The applied slurry composition was dried by conveying the aluminum foil inside a 60° C. oven for 2 minutes at a speed of 0.5 m/min. Thereafter, heat treatment was performed for 2 minutes at 120° C. to obtain a positive electrode web.

The resultant positive electrode web was rolled by a roll press to obtain a positive electrode including a positive electrode mixed material layer.

<Preparation of Separator>

A single layer separator made of polypropylene (produced by Celgard, LLC.; product name: CELGARD 2500) was cut to 120 cm×5.5 cm.

<Production of Secondary battery>

The obtained post-pressing positive electrode was cut out as a 49 cm×5 cm rectangle and was placed with the surface at the positive electrode mixed material layer-side on top. The separator that had been cut out to 120 cm×5.5 cm was placed on the positive electrode mixed material layer such that the positive electrode was positioned at the longitudinal direction left-hand side of the separator. The obtained post-pressing negative electrode was cut out as a 50 cm×5.2 cm rectangle and was placed on the separator such that the surface at the negative electrode mixed material layer-side of the negative electrode faced the separator and such that the negative electrode was positioned at the longitudinal direction right-hand side of the separator. The resultant laminate was wound by a winding machine to obtain a roll. The roll was packed into an aluminum packing case serving as a battery case. An electrolyte solution (solvent: ethylene carbonate/diethyl carbonate/vinylene carbonate=68.5/30/1.5 (volume ratio); electrolyte: $LiPF_6$ of 1 M in concentration) was injected into the aluminum packing case such that air did not remain, and then an opening of the aluminum packing case was closed by heat sealing at 150° C. to produce a wound lithium ion secondary battery having a capacity of 800 mAh. The amount of lithium deposition on the negative electrode was evaluated. The results are shown in Table 1.

Examples 2 and 3

A binder composition, a slurry composition, a negative electrode, a positive electrode, a separator, and a secondary battery were produced in the same way as in Example 1 with the exception that the amount of t-dodecyl mercaptan used as a molecular weight modifier in production of the polymer A was changed to 0.20 parts (Example 2) or 0.35 parts (Example 3). Each evaluation was performed in the same way as in Example 1. The results are shown in Table 1.

Examples 4 and 5

A binder composition, a slurry composition, a negative electrode, a positive electrode, a separator, and a secondary battery were produced in the same way as in Example 1 with the exception that the amount of t-dodecyl mercaptan used as a molecular weight modifier in production of the polymer B was changed to 0.80 parts (Example 4) or 0.30 parts (Example 5). Each evaluation was performed in the same way as in Example 1. The results are shown in Table 1.

Example 6

A binder composition, a slurry composition, a negative electrode, a positive electrode, a separator, and a secondary battery were produced in the same way as in Example 1 with the exception that in production of the polymer B, the amount of 1,3-butadiene was changed to 22 parts and the amount of styrene was changed to 73.5 parts. Each evaluation was performed in the same way as in Example 1. The results are shown in Table 1.

Example 7

A binder composition, a slurry composition, a negative electrode, a positive electrode, a separator, and a secondary battery were produced in the same way as in Example 1 with the exception that in production of the polymer B, the amount of 1,3-butadiene was changed to 68 parts and the amount of styrene was changed to 27.5 parts. Each evaluation was performed in the same way as in Example 1. The results are shown in Table 1.

Example 8

A binder composition, a slurry composition, a negative electrode, a positive electrode, a separator, and a secondary battery were produced in the same way as in Example 1 with the exception that the mixing ratio of the polymer A and the polymer B in production of the binder composition was changed such that, in terms of solid content ratio, polymer A:polymer B=30:70. Each evaluation was performed in the same way as in Example 1. The results are shown in Table 1.

Comparative Example 1

A binder composition, a slurry composition, a negative electrode, a positive electrode, a separator, and a secondary battery were produced in the same way as in Example 1 with the exception that in production of the polymer A, the amount of 1,3-butadiene was changed to 82 parts, the amount of styrene was changed to 14 parts, acrylonitrile was not used, and the amount of t-dodecyl mercaptan used as a molecular weight modifier was changed to 0.18 parts. Each evaluation was performed in the same way as in Example 1. The results are shown in Table 1.

Comparative Example 2

A binder composition, a slurry composition, a negative electrode, a positive electrode, a separator, and a secondary battery were produced in the same way as in Example 1 with the exception that the amount of t-dodecyl mercaptan used as a molecular weight modifier in production of the polymer B was changed to 1.1 parts. Each evaluation was performed in the same way as in Example 1. The results are shown in Table 1.

Comparative Example 3

A slurry composition, a negative electrode, a positive electrode, a separator, and a secondary battery were produced in the same way as in Example 1 with the exception that a binder composition produced as described below was used. Each evaluation was performed in the same way as in Example 1. The results are shown in Table 1.

<Production of Binder Composition>

A reactor was charged with 150 parts of deionized water, 25 parts of sodium dodecylbenzenesulfonate aqueous solution (concentration 10%) as an emulsifier, 63 parts of styrene as an aromatic vinyl monomer, 3.5 parts of itaconic acid as a carboxy group-containing monomer, 1 part of 2-hydroxyethyl acrylate as a hydroxy group-containing monomer, and 1.2 parts of t-dodecyl mercaptan as a molecular weight modifier in this order. Next, gas inside the reactor was purged with nitrogen three times, and then 32.5 parts of 1,3-butadiene was added as an aliphatic conjugated diene monomer. With the reactor maintained at 60° C., 0.5 parts of potassium persulfate was added as a polymerization initiator to initiate a polymerization reaction and the polymerization reaction was continued under stirring. At the point at which the polymerization conversion rate reached 96%, cooling was performed and 0.1 parts of hydroquinone aqueous solution (concentration 10%) was added as a polymerization inhibitor to terminate the polymerization reaction. Thereafter, residual monomer was removed using a rotary evaporator with a water temperature of 60° C. to yield a water dispersion of a polymer (particulate polymer). The THF-insoluble content and volume-average particle diameter of this polymer were measured. The results are shown in Table 1. The water dispersion of the polymer was used, as produced, as a binder composition.

In Table 1, shown below:
"BD" indicates 1,3-butadiene unit;
"MAA" indicates methacrylic acid unit;
"ST" indicates styrene unit;
"AN" indicates acrylonitrile unit;
"IA" indicates itaconic acid unit;
"2-HEA" indicates 2-hydroxyethyl acrylate unit; and
"TDM" indicates t-dodecyl mercaptan.

TABLE 1

| | | | | | Example 1 | Example 2 | Example 3 | Example 4 | Example 5 | Example 6 |
|---|---|---|---|---|---|---|---|---|---|---|
| Binder composition | Polymer A | Chemical composition | Aliphatic conjugated diene monomer unit | BD [mass %] | 72 | 72 | 72 | 72 | 72 | 72 |
| | | | Other monomer units | MAA [mass %] | 4 | 4 | 4 | 4 | 4 | 4 |
| | | | | ST [mass %] | 19 | 19 | 19 | 19 | 19 | 19 |
| | | | | AN [mass %] | 5 | 5 | 5 | 5 | 5 | 5 |
| | | Molecular weight modifier | Type | | TDM | TDM | TDM | TDM | TDM | TDM |
| | | | Used amount (based on 100 parts of all monomers) [parts by mass] | | 0.25 | 0.2 | 0.35 | 0.25 | 0.25 | 0.25 |
| | | Volume-average particle diameter [μm] | | | 0.09 | 0.09 | 0.09 | 0.09 | 0.09 | 0.09 |
| | | THF-insoluble content [mass %] | | | 30 | 26 | 48 | 30 | 30 | 30 |
| | | Amount (based on 100 parts of electrode active material) [parts by mass] | | | 1 | 1 | 1 | 1 | 1 | 1 |
| | Polymer B | Chemical composition | Aliphatic conjugated diene monomer unit | BD [mass %] | 32.5 | 32.5 | 32.5 | 32.5 | 32.5 | 22 |
| | | | Other monomer units | ST [mass %] | 63 | 63 | 63 | 63 | 63 | 73.5 |
| | | | | IA [mass %] | 3.5 | 3.5 | 3.5 | 3.5 | 3.5 | 3.5 |
| | | | | 2-HEA [mass %] | 1 | 1 | 1 | 1 | 1 | 1 |
| | | Volume-average particle diameter [μm] | | | 0.15 | 0.15 | 0.15 | 0.15 | 0.15 | 0.15 |
| | | THF-insoluble content [mass %] | | | 91 | 91 | 91 | 84 | 98 | 91 |
| | | Amount (based on 100 parts of electrode active material) [parts by mass] | | | 1 | 1 | 1 | 1 | 1 | 1 |
| | Mixing ratio (polymer A/polymer B) | | | | 50/50 | 50/50 | 50/50 | 50/50 | 50/50 | 50/50 |
| Evaluation | Electrolyte solution injectability | | | | A | A | A | A | B | A |
| | Bending resistance | | | | A | A | A | A | A | C |
| | Amount of lithium deposition | | | | A | A | B | A | A | A |
| | Peel strength | | | | A | A | A | B | A | A |

| | | | | | Example 7 | Example 8 | Comparative Example 1 | Comparative Example 2 | Comparative Example 3 |
|---|---|---|---|---|---|---|---|---|---|
| Binder composition | Polymer A | Chemical composition | Aliphatic conjugated diene monomer unit | BD [mass %] | 72 | 72 | 82 | 72 | — |
| | | | Other monomer units | MAA [mass %] | 4 | 4 | 4 | 4 | — |
| | | | | ST [mass %] | 19 | 19 | 14 | 19 | — |
| | | | | AN [mass %] | 5 | 5 | — | 5 | — |
| | | Molecular weight modifier | Type | | TDM | TDM | TDM | TDM | — |
| | | | Used amount (based on 100 parts of all monomers) [parts by mass] | | 0.25 | 0.25 | 0.18 | 0.25 | — |
| | | Volume-average particle diameter [μm] | | | 0.09 | 0.09 | 0.09 | 0.09 | — |
| | | THF-insoluble content [mass %] | | | 30 | 30 | 65 | 30 | — |
| | | Amount (based on 100 parts of electrode active material) [parts by mass] | | | 1 | 0.6 | 1 | 1 | — |
| | Polymer B | Chemical composition | Aliphatic conjugated diene monomer unit | BD [mass %] | 68 | 32.5 | 32.5 | 32.5 | 32.5 |

TABLE 1-continued

|  |  |  |  |  |  |  |  |
|---|---|---|---|---|---|---|---|
|  | Other monomer units | ST [mass %] | 27.5 | 63 | 63 | 63 | 63 |
|  |  | IA [mass %] | 3.5 | 3.5 | 3.5 | 3.5 | 3.5 |
|  |  | 2-HEA [mass %] | 1 | 1 | 1 | 1 | 1 |
|  | Volume-average particle diameter [μm] | | 0.15 | 0.15 | 0.15 | 0.15 | 0.15 |
|  | THF-insoluble content [mass %] | | 91 | 91 | 91 | 75 | 72 |
|  | Amount (based on 100 parts of electrode active material) [parts by mass] | | 1 | 1.4 | 1 | 1 | 2 |
|  | Mixing ratio (polymer A/polymer B) | | 50/50 | 30/70 | 50/50 | 50/50 | — |
| Evaluation | Electrolyte solution injectability | | B | A | B | B | D |
|  | Bending resistance | | A | B | B | C | C |
|  | Amount of lithium deposition | | A | B | C | B | C |
|  | Peel strength | | A | A | B | C | C |

As can be seen from Table 1, it was possible to obtain an electrode that had excellent peel strength and for which lithium deposition after charging and discharging was inhibited in Examples 1 to 8 in which a binder composition that contained a polymer A having a THF-insoluble content of 60 mass % or less and a polymer B having a THF-insoluble content of 80 mass % or more was used. In contrast, it can be seen from Table 1 that lithium deposition after charging and discharging, in particular, could not be sufficiently inhibited in Comparative Example 1 in which a binder composition for which the THF-insoluble content of the polymer A was more than 60 mass % was used. Moreover, it can be seen from Table 1 that electrode peel strength, in particular, decreased in Comparative Example 2 in which a binder composition for which the THF-insoluble content of the polymer B was less than 80 mass % was used. Furthermore, it can be seen from Table 1 that lithium deposition after discharging could not be sufficiently inhibited and electrode peel strength decreased in Comparative Example 3 in which a binder composition that contained only a polymer having a THF-insoluble content of more than 60 mass % and less than 80 mass % as a binder was used.

INDUSTRIAL APPLICABILITY

According to the present disclosure, it is possible to provide a binder composition for a non-aqueous secondary battery electrode and a slurry composition for a non-aqueous secondary battery electrode that can form an electrode that has excellent peel strength and for which metal deposition at the surface thereof after charging and discharging is inhibited.

Moreover, according to the present disclosure, it is possible to provide an electrode for a non-aqueous secondary battery that has excellent peel strength and for which metal deposition at the surface thereof after charging and discharging is inhibited, and a non-aqueous secondary battery including this electrode for a non-aqueous secondary battery.

The invention claimed is:

1. A binder composition for a non-aqueous secondary battery electrode comprising a polymer A, a polymer B, and water, wherein
   the polymer A has a THF-insoluble content of 60 mass % or less,
   the polymer B has a THF-insoluble content of 80 mass % or more,
   the polymer A includes an aliphatic conjugated diene monomer unit in a proportion of at least 60 mass % and not more than 72 mass %,
   the polymer B includes an aliphatic conjugated diene monomer unit in a proportion of at least 20 mass % and not more than 70 mass %,
   the polymer A is a particulate polymer,
   the polymer A has a volume-average particle diameter of 0.05 μm or more and 0.20 μm or less,
   the polymer B has a volume-average particle diameter of at least 0.01 μm and not more than 0.5 μm, and
   a content of the polymer B is at least 40 mass % and not more than 60 mass % of a total content of the polymer A and the polymer B.

2. A slurry composition for a non-aqueous secondary battery electrode comprising:
   an electrode active material; and
   the binder composition for a non-aqueous secondary battery electrode according to claim 1.

3. An electrode for a non-aqueous secondary battery comprising an electrode mixed material layer formed using the slurry composition for a non-aqueous secondary battery electrode according to claim 2.

4. A non-aqueous secondary battery comprising a positive electrode, a negative electrode, an electrolyte solution, and a separator, wherein
   at least one of the positive electrode and the negative electrode is the electrode for a non-aqueous secondary battery according to claim 3.

* * * * *